US012312861B2

(12) United States Patent
Scholz

(10) Patent No.: US 12,312,861 B2
(45) Date of Patent: May 27, 2025

(54) CHILD SAFE TENSION CORDED SHADE

(71) Applicant: Ingo Scholz, Saint Petersburg, FL (US)

(72) Inventor: Ingo Scholz, Saint Petersburg, FL (US)

( * ) Notice: Subject to any disclaimer, the term of this patent is extended or adjusted under 35 U.S.C. 154(b) by 213 days.

(21) Appl. No.: 18/045,643

(22) Filed: Oct. 11, 2022

(65) Prior Publication Data

US 2023/0332462 A1 Oct. 19, 2023

Related U.S. Application Data

(60) Provisional application No. 63/331,689, filed on Apr. 15, 2022.

(51) Int. Cl.

| | |
|---|---|
| ***E06B 9/30*** | (2006.01) |
| ***E06B 9/326*** | (2006.01) |
| ***E06B 9/38*** | (2006.01) |
| ***E06B 9/80*** | (2006.01) |
| *E06B 9/327* | (2006.01) |

(52) U.S. Cl.

CPC ................ *E06B 9/326* (2013.01); *E06B 9/38* (2013.01); *E06B 9/80* (2013.01); *E06B 9/327* (2013.01)

(58) Field of Classification Search

CPC . E06B 9/326; E06B 9/38; E06B 9/262; E06B 9/327; E06B 2009/2625; E06B 2009/2627; E06B 2009/2643; E06B 2009/3222; E06B 2009/3265; E06B 2009/588

See application file for complete search history.

(56) References Cited

U.S. PATENT DOCUMENTS 4,202,395 A * 5/1980 Heck .......................... E06B 9/68 160/279
4,444,241 A * 4/1984 Amsler ...................... E06B 9/32 160/172 R (Continued)

FOREIGN PATENT DOCUMENTS

DE 102011053648 A1 * 3/2013 ............. E06B 9/262
DE 202017105399 U1 * 1/2019

(Continued)

OTHER PUBLICATIONS

International Search Report and Written Opinion; PCT/US2022/054117; Mailed Mar. 15, 2023.

*Primary Examiner* — Johnnie A. Shablack

(74) *Attorney, Agent, or Firm* — Dunlap Bennett & Ludwig, PLLC; Anna L. Kinney

(57) ABSTRACT

A tension corded, top down/bottom up shade assembly has a fabric shade mounted between two siderails. The siderails have endcaps at each end. The shade is suspended from two of the endcaps. The shade has a top rail and a bottom rail with laterally protruding extended cord slides. The siderails have a sidewall with a front wall portion and a rear wall portion. Integral interior walls extend from the front and rear walls, forming a gap to a longitudinal cord passage. The cord passages face each other. Each endcap has a flat surface with a mounting base having lateral protrusions, end slides that fit snugly within the cord passage, and a mounting shoe stop. Mounting shoes attached to the shade each have a grooved body mounted to the mounting base. The cord slides extend through the gaps and keep cords plumb inside each cord passage and out of children's reach.

9 Claims, 5 Drawing Sheets

(56) References Cited

U.S. PATENT DOCUMENTS

| | | | | | |
|---|---|---|---|---|---|
| 4,473,101 | A * | 9/1984 | Langeler | E06B 9/262 160/279 |
| 5,082,043 | A * | 1/1992 | Moreno | B64C 1/1484 160/90 |
| 5,577,543 | A | 11/1996 | Jelic | |
| 5,906,233 | A | 5/1999 | May | |
| 6,550,522 | B1 * | 4/2003 | Lennon | E06B 9/367 160/173 R |
| 6,957,680 | B2 * | 10/2005 | Anderson | E06B 9/264 160/171 |
| 7,117,918 | B2 * | 10/2006 | Franssen | E06B 9/266 160/172 R |
| 7,191,817 | B2 * | 3/2007 | Nicolosi | E06B 9/327 160/84.06 |
| 7,325,279 | B2 | 2/2008 | Huang | |
| 7,793,700 | B2 | 9/2010 | Bossler | |
| 7,832,450 | B2 * | 11/2010 | Brace | E06B 9/262 160/84.05 |
| 8,316,911 | B2 | 11/2012 | Cleaver | |
| 8,776,859 | B2 | 7/2014 | Frederick | |
| 8,894,000 | B2 | 11/2014 | Belyea et al. | |
| 9,366,078 | B2 | 6/2016 | Choi et al. | |
| 9,593,528 | B2 * | 3/2017 | Anderson | E06B 9/327 |
| 9,797,188 | B2 * | 10/2017 | Rettig | E06B 9/266 |
| 9,810,018 | B1 | 11/2017 | Jaggli | |
| 9,988,838 | B2 * | 6/2018 | Chen | E06B 9/323 |
| 10,641,038 | B2 * | 5/2020 | Franssen | E06B 9/388 |
| 11,002,069 | B2 * | 5/2021 | Dekker | E06B 9/327 |
| 11,473,369 | B2 * | 10/2022 | Chen | E06B 9/388 |
| 11,773,648 | B2 * | 10/2023 | Huang | E06B 9/38 160/84.05 |
| 11,885,178 | B2 * | 1/2024 | Grützner | E06B 9/322 |
| 11,891,855 | B2 * | 2/2024 | Stout | E06B 9/388 |
| 2005/0028944 | A1 | 2/2005 | Early et al. | |
| 2006/0196612 | A1 * | 9/2006 | Strand | E06B 9/32 160/84.05 |
| 2006/0231214 | A1 * | 10/2006 | Whyte | E06B 9/262 160/84.04 |
| 2007/0267152 | A1 * | 11/2007 | Fan | E06B 9/262 160/84.06 |
| 2010/0065227 | A1 | 3/2010 | Murphy | |
| 2010/0299882 | A1 | 12/2010 | Brylko | |
| 2011/0005690 | A1 * | 1/2011 | Harding | E06B 9/262 160/84.03 |
| 2011/0132555 | A1 | 6/2011 | Rowley et al. | |
| 2011/0214258 | A1 | 9/2011 | Seymour et al. | |
| 2014/0048217 | A1 | 2/2014 | Hsu et al. | |
| 2014/0083630 | A1 * | 3/2014 | Wu | E06B 9/322 160/370 |
| 2015/0300083 | A1 | 10/2015 | Manske | |
| 2016/0168907 | A1 | 6/2016 | Byun | |
| 2019/0048658 | A1 | 2/2019 | Garcia Hernandez | |
| 2019/0345760 | A1 | 11/2019 | Dwarka | |
| 2021/0381308 | A1 * | 12/2021 | Li | E06B 9/326 |
| 2023/0128227 | A1 * | 4/2023 | Noyan | E06B 9/262 160/84.05 |
| 2023/0313603 | A1 * | 10/2023 | Nelissen | E06B 9/327 160/84.01 |
| 2023/0332463 | A1 * | 10/2023 | Scholz | E06B 9/80 |

FOREIGN PATENT DOCUMENTS

| | | | | | |
|---|---|---|---|---|---|
| DE | 202019102544 | U1 * | 9/2020 | |
| DE | 202022106449 | U1 * | 1/2023 | E06B 9/262 |
| EP | 2216485 | A2 * | 8/2010 | E06B 9/262 |
| EP | 2439375 | A2 * | 4/2012 | E06B 9/262 |
| EP | 2511467 | A1 * | 10/2012 | E06B 9/42 |
| EP | 2592212 | A1 * | 5/2013 | E06B 9/323 |
| EP | 3330476 | A1 * | 6/2018 | E06B 9/327 |
| EP | 3409873 | A1 * | 12/2018 | E06B 9/266 |
| PL | 190679 | B1 * | 1/1998 | |
| TW | M418166 | U | 12/2011 | |
| WO | WO-2023025841 | A1 * | 3/2023 | E06B 9/262 |

* cited by examiner

CHILD SAFE TENSION CORDED SHADE

CROSS-REFERENCE TO RELATED APPLICATION

This application claims the benefit of priority of U.S. provisional application No. 63/331,689, filed Apr. 15, 2022, the contents of which are herein incorporated by reference.

BACKGROUND OF THE INVENTION

The present invention relates to window coverings and, more particularly, to a child safe tension corded shade assembly.

Tension corded shades have two continuous cords for bottom-up top-down operation. These cords are generally exposed to either side of the shade and easily reachable by children. Toddlers and young children can get their head caught in the cords and injure or strangle themselves.

Stronger child safety regulation in window coverings has driven the development of new child protection features for tension cord shades. There is currently no commercially available tension corded shade product that can comply with the most recent regulations, i.e., that can keep the strings out of children's reach. There are U-profiles on the market that enclose a shade on the sides or top. However, the cord is fully accessible within the U-profile. None of these products prevents a child from getting to the cord when the shade is open.

As can be seen, there is a need for a tension corded shade assembly that keeps the cords out of reach of children.

SUMMARY OF THE INVENTION

In one aspect of the present invention, a tension corded, top down/bottom up shade assembly comprises a fabric shade having a top rail and a bottom rail; extended cord slides laterally protruding from the top rail and the bottom rail; a first siderail and a second siderail each having a sidewall with a front wall portion and a rear wall portion extending therefrom, and integral interior walls extending from the front wall portion and the rear wall portion, forming a gap therebetween, wherein the sidewall, the front wall portion, the rear wall portion, and the integral interior walls form a longitudinal cord passage, wherein the longitudinal cord passages face each other and the fabric shade is mounted therebetween; endcaps coupled to a first end and a second end of each siderail, each endcap having a planar surface from which extends (i) an integral mounting base having lateral protrusions, (ii) integral end slides configured to fit snugly within the longitudinal cord passage; and (iii) an integral mounting shoe stop; mounting shoes, attached to the fabric shade, each mounting shoe having a body, defining a mounting groove therein, mounted to the integral mounting base; and a cord inside each longitudinal cord passage; wherein the fabric shade is suspended from two of the endcaps and the cord slides extend through the gaps and are operative to keep the cords plumb within the longitudinal cord passage.

The present invention is a totally new approach to child safety with tension corded bottom-up top-down shades. It prevents a toddler or child from grabbing a string and putting it around his or her neck or extremities, preventing injury and strangulation. The cords are out of toddler's/children's reach in any position of the shade.

These and other features, aspects and advantages of the present invention will become better understood with reference to the following drawings, description, and claims.

DETAILED DESCRIPTION OF THE INVENTION

Figure 1:
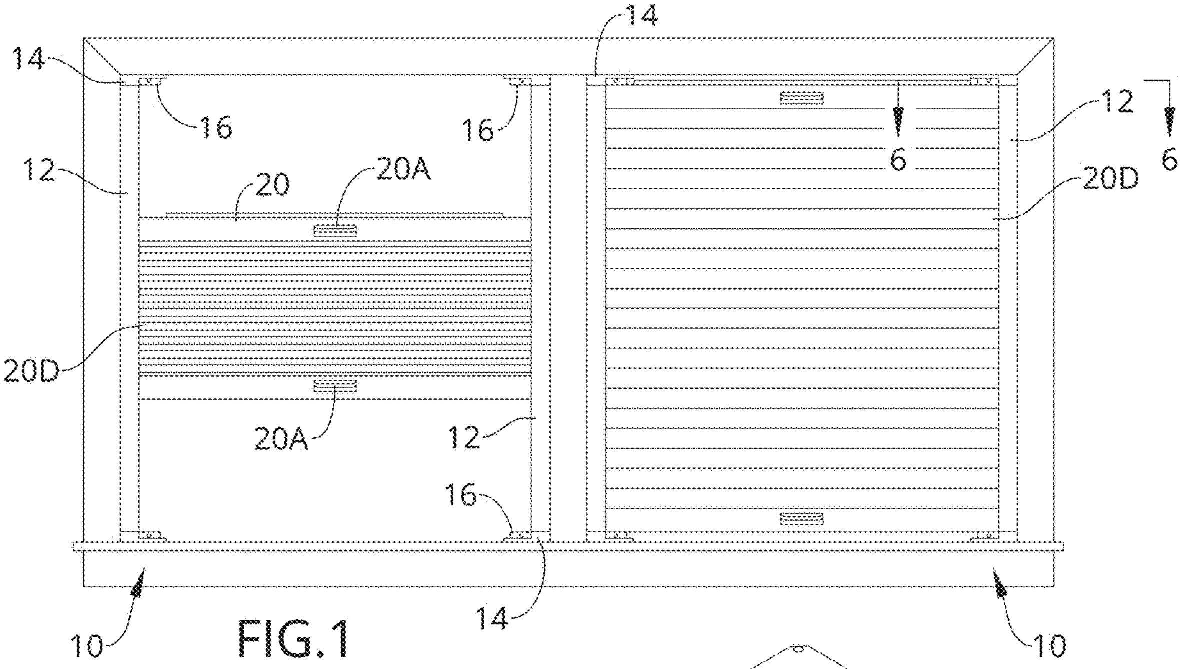
FIG. 1 is a front elevation view of continuous tension bottom-up, top-down shades with concealed cords according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a child safe tension corded shade assembly with capped siderails for tension corded bottom-up top-down shades.

The inventive assembly is sometimes referred to herein as "U-Guard Plus". The U-Guard Plus siderails bracket the shade longitudinally (i.e., vertically). The U-Guard Plus siderail has a distinctive profile comprising two inner integrated walls with a small gap or shade guide between them. The length of the siderail is a function of the height and/or length of the shade. During installation, the cords of the shade are routed behind the siderail inner walls so that they are not accessible by children.

The cords of a shade must be fully plumb to achieve a bottom-up top-down operation. If the cords are slightly off plumb, the shade will not move properly up or down. The inventive shade assembly has extended cord slides or sliding brackets that extend the cords further away from the shade, keeping the strings fully plumb behind the siderail walls while the shade moves up and down inside the rails. The extended cord slide is installed into the rail of the shade component.

The endcaps are configured to fit snugly onto the siderail. The shades hang directly inside the U-Guard Plus assembly on the end caps. The end caps may be configured to fit any suitable base.

Each mounting bracket or mounting shoe is attached to a cord end from an extended cord slide. The mounting shoe may have an integrated magnet to maintain the shade in a closed condition. The mounting shoe slides over a mounting base integrated into the endcap and clips behind a shoe lock of the endcap.

The shade may be any shade known to one of skill in the art in top-down/bottom-up shades. The shade may be, for example, a pleated fabric blind or a fabric honeycomb shade.

The shade may be installed as follows. An installer may snap or clip the endcaps onto each end of each U-Guard Plus siderail with integrated installation bases. With the U-Guard Plus siderail openings facing each other, the installer may slide mounting brackets, attached to the shade, over the integrated bases of the endcaps. The mounting bracket ensures the installer hangs the shade correctly, i.e., in a predetermined configuration, and positions the cords inside the walled portion of the siderails, secured out of children's reach. The U-Guard Plus assembly may be mounted to a window or window trim, with shade pleats oriented horizontally, and installed to any jamb, casing, or glass pane with a fastener such as adhesive or screws. Fastening hardware, such as screws, may also be used to hold components together and/or to keep components tight. The installed shade may be safely used around children.

The means of regulating movement and position of the shades are not particularly limited and may include any suitable means known in the art.

The materials of manufacture are not particularly limited and may include, for example, plastic, such as unplasticized polyvinyl chloride (UPVC), aluminum, steel, other metals, and any combination thereof. The end caps may be manufactured of, e.g., steel, plastic, or aluminum. The U-Guard Plus siderail may be made from a metal such as aluminum or a plastic with walls having any suitable thickness, e.g., from about 0.5 mil to about 1 mil thickness. The U-Guard Plus assembly material of manufacture, dimensions, and additional structural features, such as lips, grooves, and edges, may be optimized.

Referring to FIGS. 1 through 8, FIG. 1 illustrates a continuous tension bottom-up, top-down shade assembly 10 according to an embodiment of the present invention, comprising pleated shades 20 slidably mounted between vertical U-guard rails 12. The rails 12 have endcaps 14 with mounting shoes 16 held therein, as more clearly seen in FIGS. 2 through 9. The shades comprise a vane 20D suspended between a top rail and a bottom rail, each of which has a grip or a pull 20A.

Figure 2:
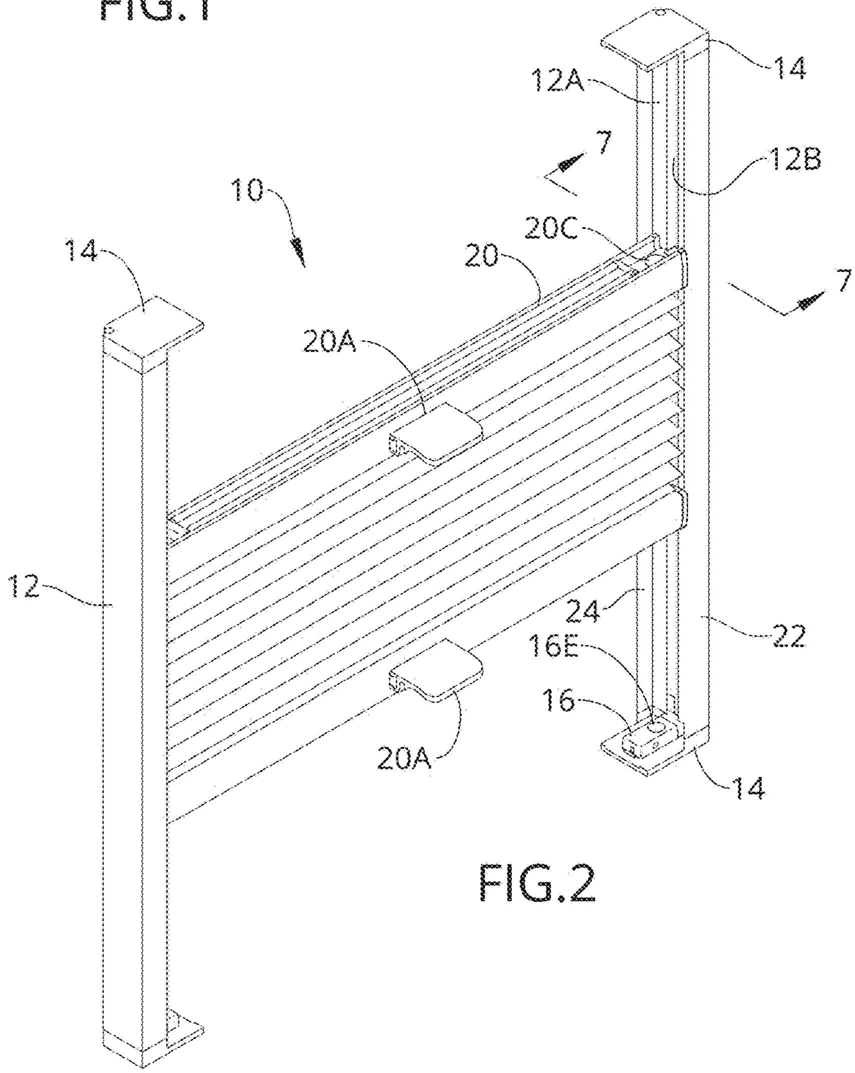
FIG. 2 is a perspective view thereof.

As seen in FIG. 2, each U-guard rail 12, i.e., a first siderail and a second siderail, has a sidewall with a perpendicular front wall portion 22 and a perpendicular rear wall portion 24 forming an open region therebetween. An integral interior wall 12A parallel to the sidewall extends from the front wall portion 22 and the rear wall portion 24, forming a shade guide or gap 12B therebetween. The mounting shoes 16 each have a shoe magnet 16E and the top and bottom rails have mating shade magnets 20C.

Figure 3:
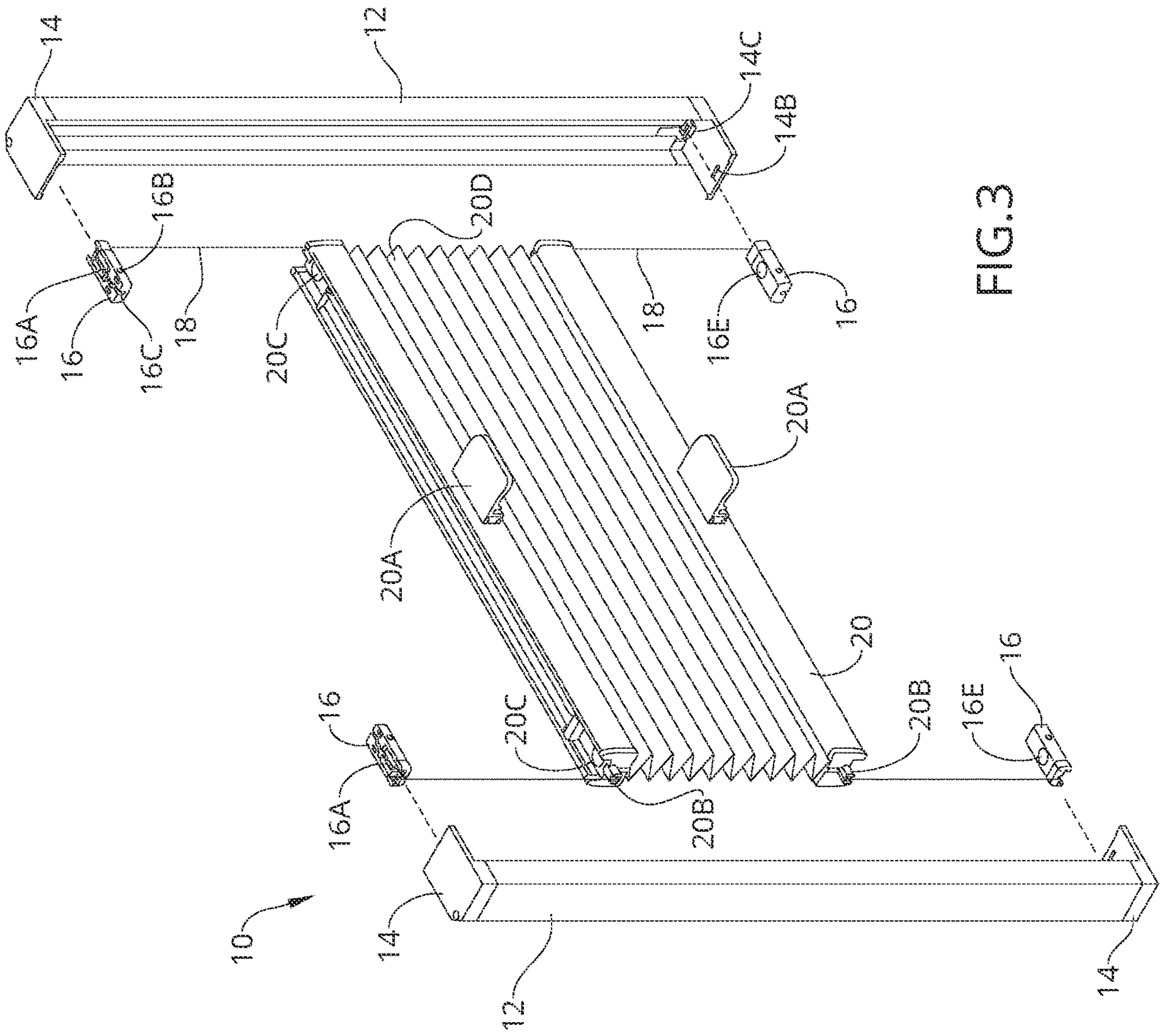
FIG. 3 is an exploded perspective view thereof.

The interior walls 12A contain cords 18 within a partitioned compartment or longitudinal cord passage within the rail 12 so they are inaccessible to children, as shown in FIG. 3. The cords 18 extend from slot inserts/cord guides 20B in the top rail and the bottom rail and are thus spaced laterally from the shades 20. A portion or recessed region of the rear sidewall is spaced from the interior walls. Each U-guard rail 12 has an end cap 14 on each end to which a mounting shoe 16 is slidably mounted. The end caps 14 each have an integral shoe lock 14B protruding from a horizontal planar surface and an integral mounting base 14C extending parallel to the horizontal planar surface. The shoes 16 slide onto a mounting base 14C and latch into place behind a shoe lock 14B.

Figure 4:
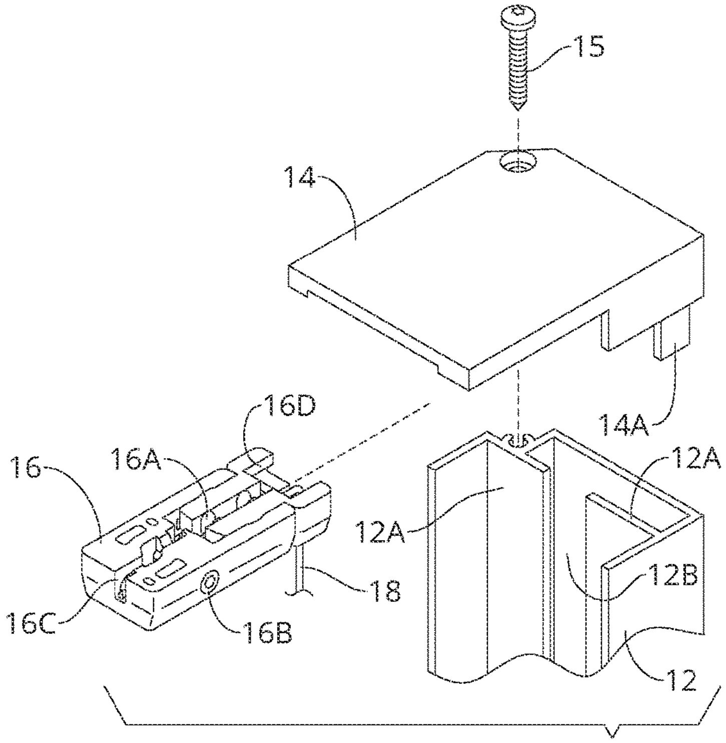
FIG. 4 is a detail top perspective exploded view thereof.
Figure 5:
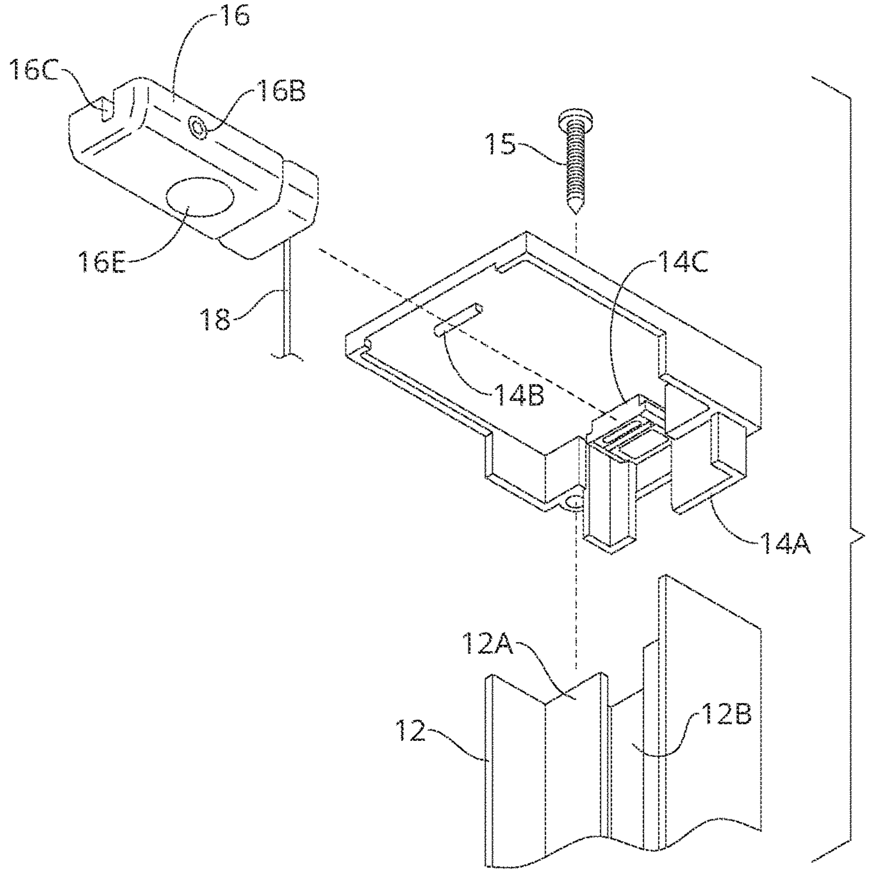
FIG. 5 is a detail bottom perspective exploded view thereof.
Figure 6:
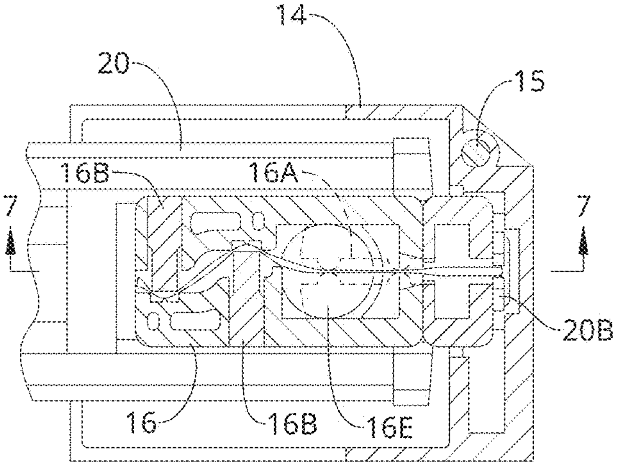
FIG. 6 is a sectional view thereof, taken along line 6-6 of FIG. 1.

As more clearly shown in FIGS. 4 and 5, the cords 18 pass through a front cord guide 16A and a rear cord channel 16C in each mounting shoe 16 and may be tightened or loosened with cord set screws 16B. The mounting shoes 16 each have a mounting slot 16D that accommodates the respective mounting base 14C. Each end cap 14 has integral rail inserts 14A that fit snugly within the cord passage, holding the end cap 14 in place behind the interior walls 12A. Cap screws may also be used to secure the end caps 14 on the rails 12.

Figure 7:
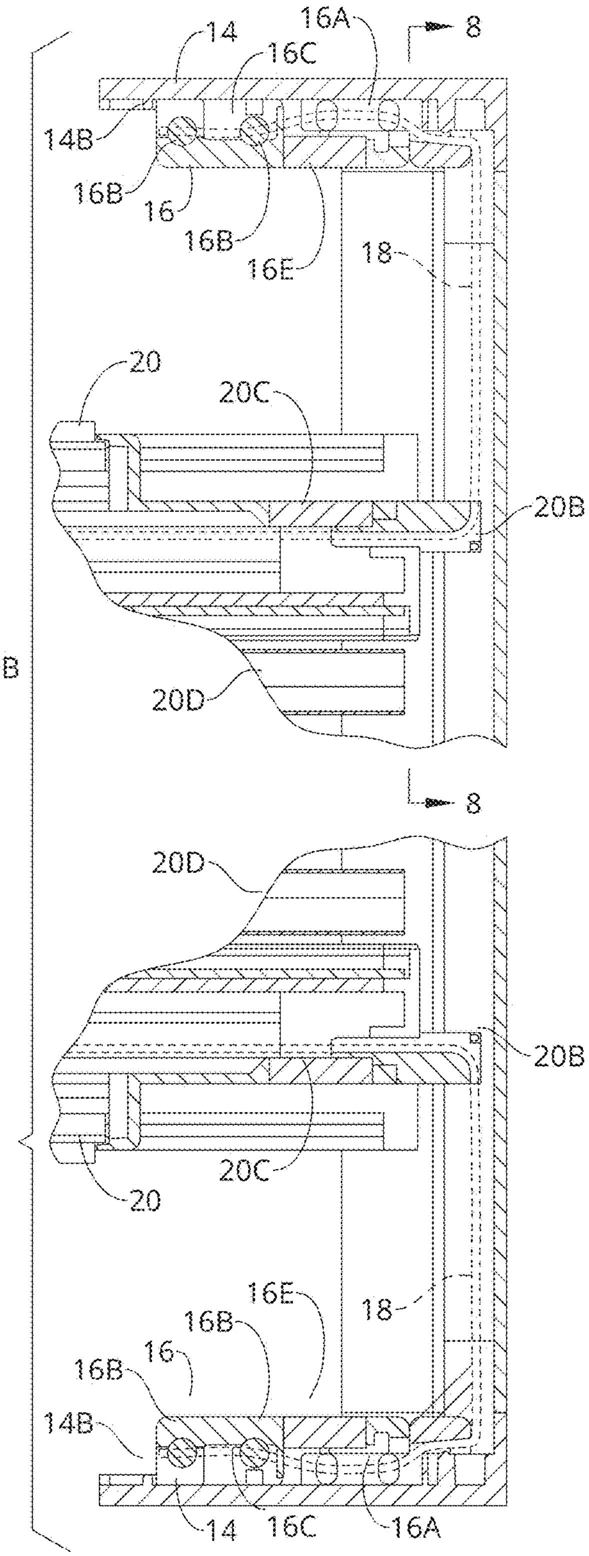
FIG. 7 is a sectional view thereof, taken along line 7-7 of FIG. 6.
Figure 8:
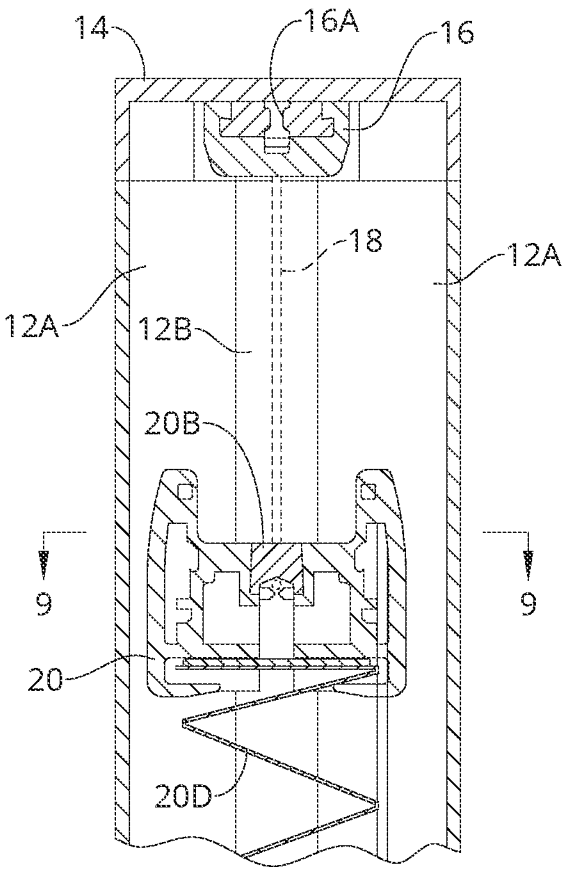
FIG. 8 is a sectional view thereof, taken along line 8-8 of FIG. 7.
Figure 9:
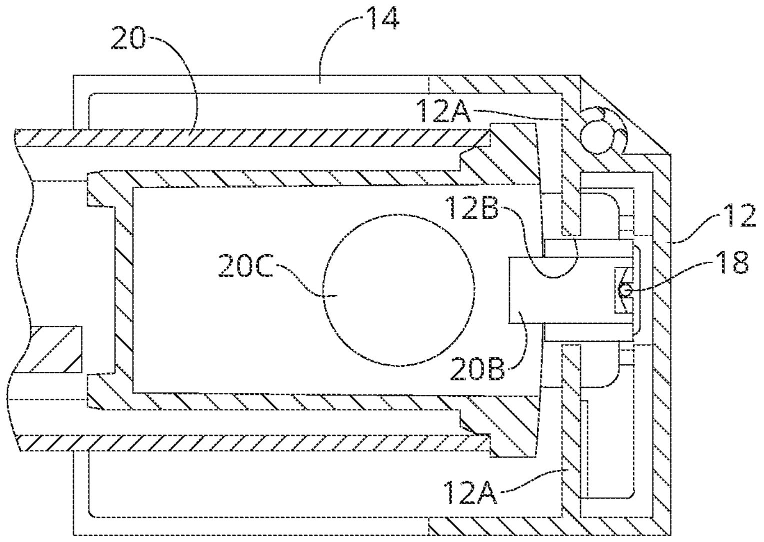
FIG. 9 is a sectional view thereof, taken along line 9-9 of FIG. 8.

The mounting shoes 16, end caps 14, and cord guides 20B are shown in more detail in FIGS. 6 through 9. FIGS. 7 and 8 more clearly illustrate the position of the cords within the shade guide 12B behind the interior rail walls 12A.

It should be understood, of course, that the foregoing relates to exemplary embodiments of the invention and that modifications may be made without departing from the spirit and scope of the invention as set forth in the following claims.

What is claimed is:

1. A tension corded, top down/bottom up shade assembly comprising:
- a fabric shade having a top rail and a bottom rail;
- extended cord guides, each of the extended cord guides laterally protruding from the top rail or the bottom rail;
- a first siderail and a second siderail each having a first end, a second end, a sidewall with a front wall portion and a rear wall portion extending therefrom, and integral interior walls extending from the front wall portion and the rear wall portion, forming a gap therebetween, wherein the sidewall, the front wall portion, the rear wall portion, and the integral interior walls form a longitudinal cord passage, wherein the longitudinal cord passages face each other and the fabric shade is mounted therebetween;
- endcaps, each endcap coupled to the first end or the second end of the first siderail or the second siderail, each endcap having a planar surface from which extends (i) an integral mounting base having lateral protrusions, (ii) integral rail inserts configured to fit snugly within the longitudinal cord passage; and (iii) an integral mounting shoe lock;
- cords extending from the extended cord guides through the longitudinal cord passages; and
- mounting shoes, each accommodating an end of one of the cords, each mounting shoe having a body, defining a mounting slot therein, mounted to the integral mounting base;
- wherein the fabric shade is suspended from two of the endcaps and the cord guides extend through the gaps and are operative to keep the cords plumb within the longitudinal cord passage.

2. The tension corded, top down/bottom up shade assembly of claim 1, wherein each mounting shoe body has a cord channel longitudinally therethrough.

3. The tension corded, top down/bottom up shade assembly of claim 1, wherein the endcaps, the first siderail, and the second siderail are formed of a material selected from the group consisting of: a metal, a plastic, and a combination thereof.

4. The tension corded, top down/bottom up shade assembly of claim 1, wherein the integral interior walls have a thickness of from about 0.5 mil to about 1 mil.

5. The tension corded, top down/bottom up shade assembly of claim 1, wherein a recessed region of the rear wall portion is spaced from the integral interior walls.

6. The tension corded, top down/bottom up shade assembly of claim 1, wherein the mounting shoes and the top and bottom rails have mating magnets.

7. The tension corded, top down/bottom up shade assembly of claim 1, wherein the top rail and the bottom rail each have a central grip.

8. The tension corded, top down/bottom up shade assembly of claim 1, further comprising fastening hardware threadedly attaching the end cap to the side rail.

9. The tension corded, top down/bottom up shade assembly of claim 1, further comprising fastening hardware threadedly securing the cords within the mounting shoes.

* * * * *